(12) United States Patent
Bretl et al.

(10) Patent No.: US 10,907,720 B2
(45) Date of Patent: Feb. 2, 2021

(54) HELICAL TOOTH SYSTEM HAVING MODIFIED TOOTH MESHING

(71) Applicant: Bayerische Motoren Werke Aktiengesellschaft, Munich (DE)

(72) Inventors: Nick Bretl, Eching (DE); Matthias Stangl, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 322 days.

(21) Appl. No.: 15/980,106

(22) Filed: May 15, 2018

(65) Prior Publication Data

US 2018/0259055 A1  Sep. 13, 2018

Related U.S. Application Data

(63) Continuation of application No. PCT/EP2016/076497, filed on Nov. 3, 2016.

(30) Foreign Application Priority Data

Nov. 23, 2015 (DE) .......................... 10 2015 223 119

(51) Int. Cl.
*F16H 55/08* (2006.01)
*F16H 55/17* (2006.01)
*F16H 55/14* (2006.01)

(52) U.S. Cl.
CPC ......... *F16H 55/0886* (2013.01); *F16H 55/14* (2013.01); *F16H 55/17* (2013.01)

(58) Field of Classification Search
CPC ....... F16H 55/0886; F16H 55/14; F16H 55/16
See application file for complete search history.

(56) References Cited

U.S. PATENT DOCUMENTS 1,883,432 A * 10/1932 Whitney ............... F02N 15/025
74/6
2,117,230 A * 5/1938 Thornburg ............ F02N 15/023
123/179.3
(Continued)

FOREIGN PATENT DOCUMENTS

CN  100487281 C  5/2009
CN  102317615 A  1/2012
(Continued)

OTHER PUBLICATIONS

Remmlinger, Translation of DE19721568—(Year: 1997).*
(Continued)

*Primary Examiner* — William Kelleher
*Assistant Examiner* — Gregory T Prather
(74) *Attorney, Agent, or Firm* — Crowell & Moring LLP

(57) ABSTRACT

A gear for transmitting power has a plurality of teeth, each having two tooth flanks for transmitting power to another gear. The gear can be rotated about an axis of rotation, and has a reference plane, which is arranged orthogonal to the axis of rotation. Tooth flanks of the same name are the tooth flanks for transmitting power in one direction of rotation, wherein the tooth flanks have a tooth flank length proceeding from a front side of the reference plane. Two tooth flanks of the same name are arranged directly adjacent to a crown tooth flank, said two tooth flanks of the same name each having a smaller tooth flank length than the crown tooth flank. The gear has at least one of the crown tooth flanks and is configured as a helically toothed gear.

12 Claims, 3 Drawing Sheets

(56) References Cited

U.S. PATENT DOCUMENTS

| | | | | |
|---|---|---|---|---|
| 4,524,643 | A | * | 6/1985 | Ziegler ................. F16H 1/2836 |
| | | | | 475/345 |
| 2002/0020959 | A1 | | 2/2002 | Matsuda et al. |
| 2007/0042860 | A1 | * | 2/2007 | Rihn ....................... F16H 57/08 |
| | | | | 475/344 |
| 2007/0137355 | A1 | * | 6/2007 | Ohmi ................. F16H 55/0886 |
| | | | | 74/462 |
| 2008/0022799 | A1 | * | 1/2008 | Kashimura ............ F16H 55/16 |
| | | | | 74/460 |
| 2011/0308490 | A1 | | 12/2011 | Hartmann et al. |
| 2013/0160589 | A1 | * | 6/2013 | Mittermair ............. F16H 55/06 |
| | | | | 74/409 |
| 2016/0010739 | A1 | * | 1/2016 | Schneider .......... F16H 55/0886 |
| | | | | 74/457 |

FOREIGN PATENT DOCUMENTS

| | | |
|---|---|---|
| DE | 39 34 841 A1 | 5/1990 |
| DE | 197 21 568 A1 | 12/1997 |
| DE | 601 08 018 T2 | 6/2005 |
| DE | 197 21 568 B4 | 9/2005 |
| DE | 10 2007 016 019 B3 | 9/2008 |
| DE | 10 2008 054 979 A1 | 6/2010 |
| EP | 0 547 632 A1 | 6/1993 |
| FR | 519 869 A | 6/1921 |
| FR | 713 722 A | 10/1931 |
| GB | 1901/7682 A | 3/1902 |

OTHER PUBLICATIONS

Chinese-language Office Action issued in counterpart Chinese Application No. 201680050036.8 dated Oct. 24, 2019 with English translation (16 pages).

International Search Report (PCT/ISA/210) issued in PCT Application No. PCT/EP2016/076497 dated Feb. 20, 2017 with English translation (eight pages).

German-language Written Opinion (PCT/ISA/237) issued in PCT Application No. PCT/EP2016/076497 dated Feb. 20, 2017 (five pages).

German-language Office Action issued in counterpart German Application No. 10 2015 223 119.4 dated Jul. 18, 2016 (five pages).

\* cited by examiner

HELICAL TOOTH SYSTEM HAVING MODIFIED TOOTH MESHING

CROSS REFERENCE TO RELATED APPLICATIONS

This application is a continuation of PCT International Application No. PCT/EP2016/076497, filed Nov. 3, 2016, which claims priority under 35 U.S.C. § 119 from German Patent Application No. 10 2015 223 119.4, filed Nov. 23, 2015, the entire disclosures of which are herein expressly incorporated by reference.

BACKGROUND AND SUMMARY OF THE INVENTION

The invention relates to a gear for power transmission with a plurality of teeth each having two tooth flanks for power transmission to another gear. Such gears are known from the prior art, in particular from DE 601 08 018 T2.

In the following, the invention is described using a gear for use in a motor vehicle transmission. Limiting of the invention to such an application is not intended.

In order to transmit drive power from a drive unit to a driven motor vehicle axle, gears are used in motor vehicle transmissions. Thereby, the teeth of the gear set up for power transmission are equidistantly spaced away from each other. The teeth of the gear mesh with the teeth of a mating gear, which this transmits power to. This power transmission results in occurrences of meshing shock (beginning of a tooth meshing). Furthermore, during the course of the meshing process, double (two teeth of a gear mesh at the same time) and single meshing (one tooth meshes) alternate. This leads to stiffness fluctuations in the torque transmission; overall, this leads to vibration stimulation of the gears and subsequently to the emission of noise. This stimulation occurs periodically with the tooth meshing frequency because the tooth flanks are equidistantly spaced away from each other in the circumferential direction. Such stimulation is generally perceived as being disturbing and is frequently reduced by means of sound dampening and/or fine tuning the gear geometry, such as tooth-tip or tooth-root reduction or other gearing corrections, wherein the effectiveness of these measures depends on the present gear geometry. Such gearing corrections are highly precise geometry changes of the tooth flanks, and therefore are generally time-consuming and expensive to manufacture.

From DE 10 2007 016 019 A1, gears are known, where adjacent teeth on a single gear have a different geometry. Furthermore, gears for special applications with a different tooth width across the circumference are known from DE 601 08 018 T2.

It is an object of the invention to provide a gear for power transmission to another gear, wherein this gear has an improved stimulation behavior in relation to conventional gears.

This and other objects are achieved by a gear for power transmission, comprising a plurality of teeth each having two tooth flanks for power transmission to another gear, wherein the gear can be rotated around a rotation axis and has a reference plane arranged orthogonally to the rotation axis, wherein like tooth flanks are tooth flanks for power transmission in a rotational direction. The tooth flanks, starting from a front side of the reference plane, have a tooth flank length. Two like tooth flanks, which are directly adjacent to a crown tooth flank are arranged, which each have a smaller tooth flank length than the crown tooth flank, and the gear has at least one of said crown tooth flanks and is configured as a helical gear.

As set forth, common tooth flank corrections move within a range of a few µm (fine machining) for noise optimization; in particular, by means of the invention, it is made possible to improve the noise behavior of gears, wherein this is implemented by changing the geometry of the gear within a range of tenths of a millimeter or more (rough machining).

In terms of the invention, a 'gear' is understood to mean a spur gear or a ring gear with a succession of, preferably periodic, teeth distributed across the circumference for power transmission to another gear; such gears are known from the prior art. Thereby, power is ensured by a transmission of rotational speed and torque between the gears. In particular, gears for power transmission can be differentiated from those for motion transmission, since no notable torque and therefore no notable forces can generally be transmitted using gears for motion transmission. Gears for power transmission are preferably designed as surface-hardened or preferably as tempered gears, wherein at least the area of the gear, in which the teeth are arranged, is preferably made of a steel material.

Gears can preferably have different tooth shapes with reference to the geometrical base form of their teeth. Preferably, the invention relates to gears with an involute toothing, however, the invention is applicable in particular independently of the tooth shape. Furthermore, the invention can also preferably be applied to gears with or without a gearing correction. Such a gear is furthermore preferably provided for use in a motor vehicle transmission in the drive train, furthermore, such gears are preferably used in motor vehicle automatic or manual transmissions or automatically shifted transmissions.

In terms of the invention, a 'tooth flank' of a gear is understood to mean the area of the tooth on the gear which is set up for power transmission, meaning for contacting the other gear for power transmission. Here, a gear according to the invention can be used both with a conventional gear as known from the prior art as well as with another gear according to the invention as a gear pair for power transmission. Figuratively speaking, under the term tooth flank, the surface area is to be understood, which is set up for the planned contacting of the mating gear. The surface of the tooth can extend beyond this area provided for power transmission, in particular in the tooth-root area.

In terms of the invention, 'two like tooth flanks' is understood to mean two tooth flanks which are provided in the same rotational direction for power transmission. Preferably, a tooth of the gear has two tooth flanks, wherein these two tooth flanks are not alike and, in particular, can also be called left or right tooth flanks.

Preferably, the gear for power transmission can be rotated around a rotation axis. In particular, the gear, in the case of an outer gear can be comprehended as an essentially cylindrical base body, on the outer circumference of which the teeth are arranged equidistantly spaced away from one another with reference to the circumferential direction, wherein the rotation axis coincides with the cylinder axis. The same applies to ring gears, on which the invention can also be applied.

In terms of the invention, a 'reference plane' is to be understood as an imaginary plane, which is arranged orthogonally to this rotation axis. Furthermore, preferably the reference plane intersects a plurality of teeth of the gear and preferably, this plane intersects all teeth of the gear. Preferably, the reference plane is understood as a middle gear plane or symmetry plane, which is arranged at least substantially symmetrically within the gear.

In terms of this invention, a 'tooth flank length' is understood to mean the extent of one of the tooth flanks starting from the reference plane until the end of the tooth flank. In particular, under this term, the distance between the reference plane and the point furthest away from this reference plane of the tooth flank is understood.

In terms of the invention, a 'crown tooth flank' is understood to mean a tooth flank which is directly adjacent to two like tooth flanks, wherein these adjacent tooth flanks each have a smaller tooth-flank length than the crown tooth flank. Conversely, the crown tooth flank can be understood as the longest of three tooth flanks, wherein one of the shorter tooth flanks is arranged immediately before the crown tooth flank and the other immediately after. In this context, the specifications "before" and "after" refer to the rotational direction of the gear, or the circumferential direction of the gear.

In terms of the invention, under 'helical gear', a spur gear or a ring gear with helical gearing is understood, as this is known from the prior art.

Preferably, a helical gear has at least one substantially cylindrical base body, wherein the teeth for power transmission are arranged on the exterior circumference of this base body; the tooth flanks are arranged here at an inclined angle with respect to the rotation axis. This applies to helical ring gears accordingly. Helical gears thus differ particularly from straight-toothed gears through a so-called helix angle of the teeth. Here, helical gears are, as set forth, known as both as outer gears as well as ring gears.

In particular, in the case of helical gears, for power transmission, the tooth flanks initially come into contact with the tooth flanks of the other gear, to which the power is transmitted, with the edge area, referring to the extension of the gear in the direction of the rotation axis, and with the outermost area of the tooth flank. This point in time can be understood in particular as initial meshing.

Generally, initial meshing of the tooth flanks of the gears lead to a noise-prone occurrence of meshing shock and, in particular, the stiffness of the tooth varying during the meshing process leads to another vibration stimulation of the gear. Due to kinematic conditions, the like tooth flanks of a gear are equidistantly spaced away from each other in the circumferential direction and, during power transmission, this results in a periodic stimulation of the gears and the components surrounding the gears. This stimulation is generally not desired.

In particular, due to the different tooth flank lengths, initial meshing can be influenced in such a way that a certain tooth meshing frequency can be prevented, and in this way a more favorable stimulation behavior of the gear can be achieved. Studies have shown that a variety of crown tooth flanks continue to positively affect the noise behavior of the gear.

In a preferred embodiment, the gear has two or more crown tooth flanks. Preferably, these crown tooth flanks are spaced away from each other in the circumferential direction of the gear with the distance of separation being in each case equivalent to the size of a single crown flank. Furthermore, preferably, at least two, preferably a plurality and especially preferably, all crown flank distances are different. Furthermore, preferably, at least two, preferably a plurality and especially preferably, all crown flank distances are equal in size. In particular, by means of a plurality of crown tooth flanks, an especially favorable stimulation behavior of the gear can be achieved during power transmission.

In a preferred embodiment, the gear has a plurality of different tooth flank lengths. Preferably, the largest tooth flank length deviation, meaning the difference between the largest tooth flank length and the smallest tooth flank length on a single gear, is smaller than 10 mm, preferably smaller than 5 mm and especially preferably smaller than 1 mm. Furthermore, preferably, the tooth flank length deviation is dependent on the gear width, i.e. the extension of the tooth flank toward the rotation axis, and is preferably smaller than 25%, preferably smaller than 10% and especially preferably smaller than 3%, in particular, based on the gear width of the tooth flank with the largest tooth flank length. Studies have shown, when tooth flank lengths from the aforementioned range are selected, on the one hand, a good noise behavior for the gear can be achieved and, on the other hand, a sufficient level of load-carrying capacity can be achieved.

In a preferred embodiment, tooth flanks with different tooth flank lengths are distributed across the circumference of the gear, in particular at random. Here, in terms of the invention, 'random' is understood to mean that a plurality of tooth flanks in succession have a continuously increasing or decreasing tooth flank length, but that the length increase or the length decrease of tooth flanks in succession is continually different. Furthermore, preferably a row of like tooth flanks in succession have a continuously increasing tooth flank length. Furthermore, such a row of like tooth flanks comprises less than a fourth of the like tooth flanks arranged on the gear overall, preferably less than a tenth, and especially preferably less than a twentieth. Preferably, 10 or less like tooth flanks in succession have a continuously increasing number flank length, preferably six or less and especially preferably three or less. In particular, by means of such an embodiment, on the one hand, it can be achieved that the initial meshing does not result in any periodic stimulation of the gear and, on the other hand a certain gear width is maintained.

In a preferred embodiment, the tooth flanks, starting form from a back side of the reference plane, have a back-mounted tooth flank length. Preferably, two like tooth flanks are arranged immediately adjacent to a back-mounted crown tooth flank. Here, both of these like tooth flanks located adjacent to the crown tooth flank have a respectively smaller back-mounted tooth flank length than the back-mounted crown tooth flank. Furthermore, preferably, the gear has at least one or a plurality of back-mounted crown tooth flanks.

Preferably, the gear has a plurality of back-mounted crown tooth flanks. In particular, with the back-mounted crown tooth flank length, the meshing end can be influenced during power transmission or the initial meshing if the rotation direction of the power transmission is reversed. In accordance with this, the back-mounted tooth flank length can be designed in the same way as the aforementioned tooth flank length.

In a preferred embodiment, the gear has two or more back-mounted crown tooth flanks, preferably a plurality of back-mounted crown tooth flanks. Furthermore, preferably, these back-mounted crown tooth flanks are spaced away from each other in the circumferential direction having a distance of separation that is equal to the size of a single crown flank. Furthermore, preferably, at least two, preferably a plurality and especially preferably, all back-mounted crown flank distances are different. Furthermore, preferably, at least two, preferably a plurality and especially preferably, all back-mounted crown flank distances are equal. In particular, by means of a plurality of back-mounted crown tooth flanks, an especially favorable stimulation behavior of the gear can be achieved during power transmission.

In a preferred embodiment, the gear has a plurality of different back-mounted tooth flank lengths. Preferably, the largest back-mounted tooth flank length deviation, meaning the difference between the largest back-mounted tooth flank length and the smallest back-mounted tooth flank length on a single gear, is smaller than 10 mm, preferably smaller than 5 mm and especially preferably smaller than 1 mm. Furthermore, preferably, the back-mounted tooth flank length deviation is dependent on the gear width, i.e. the extension of one of the tooth flanks toward the rotation axis, and is preferably smaller than 25%, preferably smaller than 10% and especially preferably smaller than 3%, in particular, based on the gear flank that has the higher value when the tooth flank length and the back-mounted tooth flank length are added together. Studies have shown that when back-mounted tooth flank lengths from the aforementioned range are selected, on the one hand, a good noise behavior for the gear can be achieved and, on the other hand a sufficient level of load-carrying capacity can be achieved.

In a preferred embodiment, an 'overall flank length' of a single tooth flank is understood to mean the sum of the tooth flank length and the back-mounted tooth flank length. Preferably, the gear has three like tooth flanks with the same total flank length. Furthermore, preferably, the gear has a plurality of tooth flanks with the same overall flank length, preferably 10% or more of the available like tooth flanks have the same overall flank length and furthermore, preferably 50% or less of the available like tooth flanks have the same overall flank length. In particular, by means of a plurality of tooth flanks with the same overall flank length, a gear which is particularly easy to manufacture can be presented.

Under a gear pair according to the invention, preferably a gear pair with a first gear with the aforementioned design is understood, which meshes with another gear for power transmission, wherein this other gear can be a conventional gear known from the prior art or also a gear designed according to the invention. Preferably, the driven gear is a gear according to the invention and the driven gear is designed as a gear known from the prior art. A gear pair with only one gear according to the invention is particularly inexpensive to manufacture and in the case of a gear pair with two gears according to the invention, a further improvement of stimulation behavior can be achieved.

A 'vehicle transmission' in terms of the invention is understood to mean a transmission in the drivetrain of a motor vehicle, in particular, a passenger car, wherein, due to the vehicle transmission, the drive power that is made available to overcome the driving resistance can be completely or at least partially transmitted. Preferably, such a vehicle transmission is designed as a manual transmission, an automatically shifting transmission or as an automatic transmission. Furthermore, preferably, in such a vehicle transmission, at least one gear according to the invention of the aforementioned type or a gear pair of the aforementioned type are arranged and preferably, such a motor vehicle transmission has a plurality of gears according to the invention, especially preferably, all of the gears involved in transmitting the drive power are designed as gears according to the invention. In particular, due to the use of one or a plurality of gears according to the invention, a vehicle transmission can be achieved with an especially good noise and stimulation behavior.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
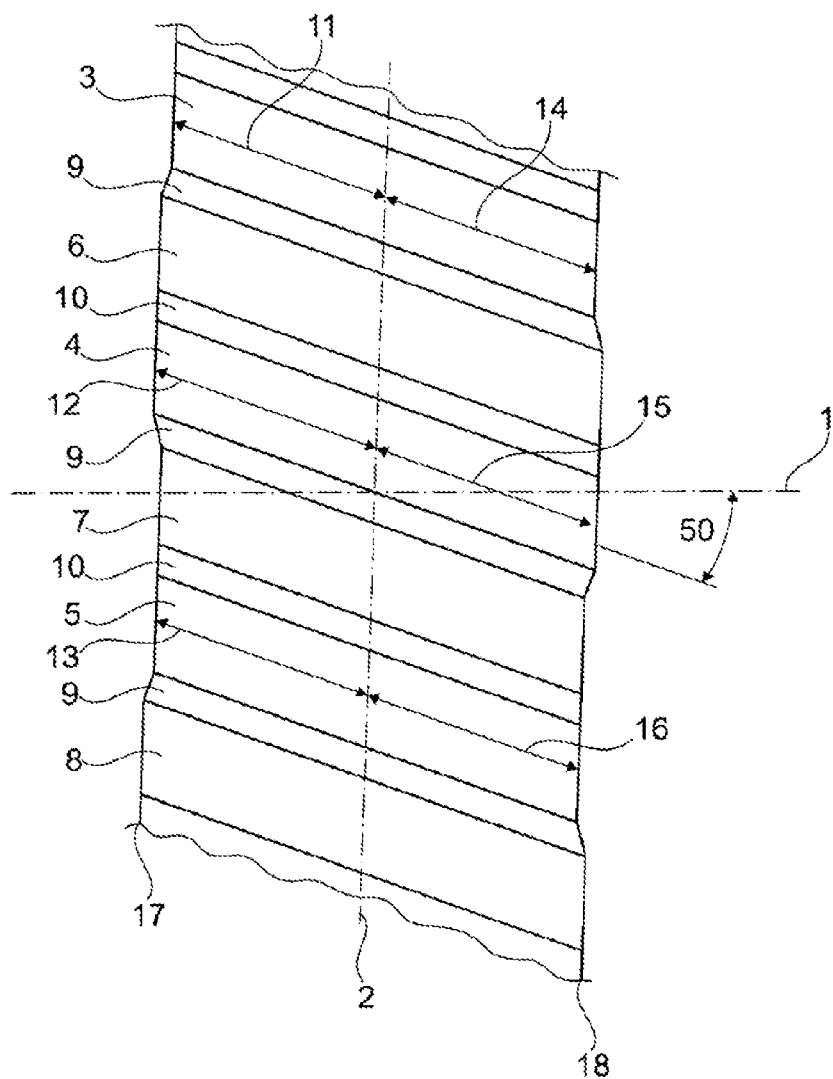
FIG. 1 is a simplified top view of a plurality of tooth flanks of a gear.

In FIG. 1, a simplified top view of a plurality of tooth flanks of a gear is shown. Such a helical gear can be rotated around a rotation axis 1 and has a reference plane 2. The helical gearing is illustrated by the helix angle 50 of the teeth. The tooth flanks 3, 4, 5 are like tooth flanks (left tooth flanks); likewise, the tooth flanks 6, 7, 8 are like tooth flanks (right tooth flanks). On the one hand, a tooth-root area 9 is arranged in each case between the tooth flanks and, on the other hand, a tooth-tip area 10 is arranged. Using the reference plane 2 as a basis, the first left tooth flank 3 has the first tooth flank length 11, the second left tooth flank 4 has the second tooth flank length 12 and the third left tooth flank 5 has the third tooth flank length 13. The first and the third tooth flank lengths 11, 13 are less than the second tooth flank length 12 so that the second left tooth flank portrays the crown tooth flank.

Due to the change of the tooth flank length, the initial meshing can be influenced during motion transmission since the meshing with another gear, to which power is transmitted, is started in the outer edge area 17, 18 of the gear in the case of a helix gearing. In this case the relevant edge area for the initial meshing is dependent on the rotation direction of the gear.

The reference plane 2 is arranged as a symmetry plane so that the tooth flanks also have a back-mounted tooth flank length, starting from the back side of the reference plane 2. The first left tooth flank 3 has the first back-mounted tooth flank length 14, the second left tooth flank 4 has the second back-mounted tooth flank length 15 and the third left tooth flank 5 has the third back-mounted tooth flank length 16. Here, the overall flank length for a tooth flank is in each case the sum of the tooth flank length (11, 12, 13) and the back-mounted tooth flank length (14, 15, 16).

Figure 2:
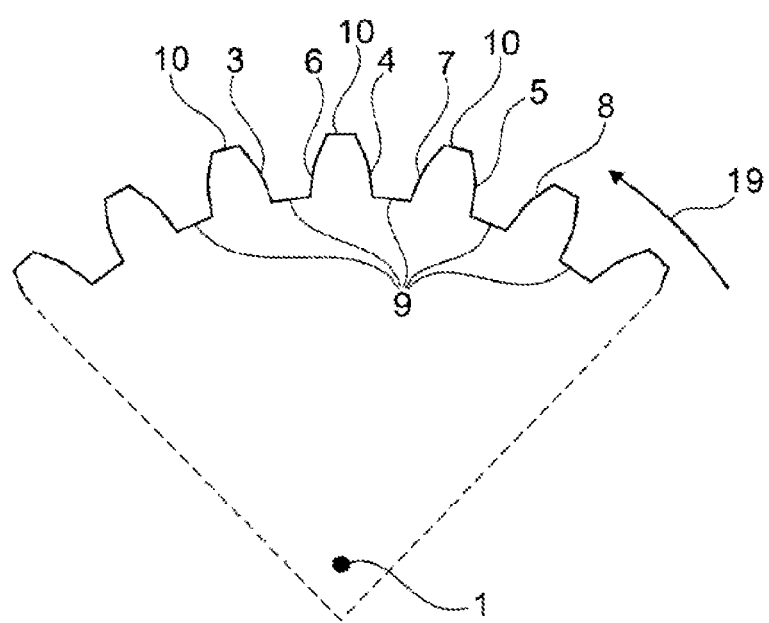
FIG. 2 shows an area of a gear according to an embodiment of the invention in a simplified front view.

In FIG. 2, a simplified front view of an area of a helix gear is shown as illustrated in FIG. 1. Here thereby, the succession of tooth flanks (8, 7, 6 and 5, 4, 3) can be recognized in the circumferential direction 19 with the tooth-tip areas 10 and the tooth-root areas 9. The gear can be rotated around the rotational axis 1.

Figure 3:
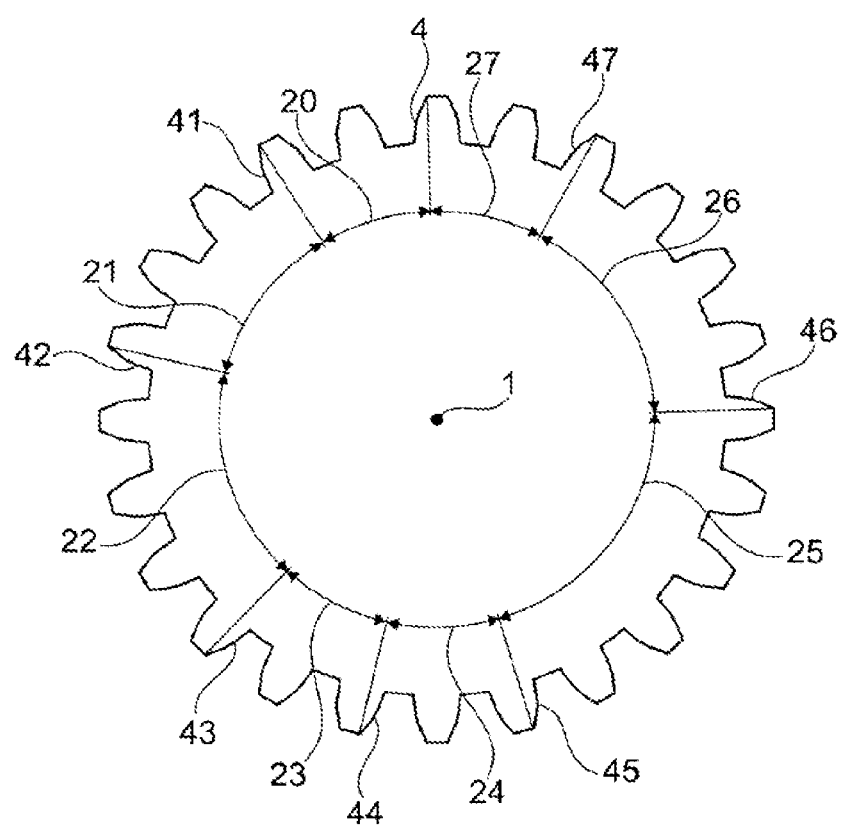
FIG. 3 shows a simplified front view of a gear according to an embodiment of the invention.

In FIG. 3, a simplified front view of a gear according to the invention with different crown flank distances 20 to 27 is shown. The represented gear has a plurality of crown tooth flanks (4, 41, 42, 43, 44, 45, 46, 47), which are randomly distributed over the circumference and spaced away from each other by a separation distance of the size of a single crown flank length (20, 21, 22, 23, 24, 25, 26, 27). Every crown flank (4, 41, 42, 43, 44, 45, 46, 47) is directly adjacent to two like tooth flanks, the tooth flank length of which, which cannot be seen in this view, is shorter than the tooth flank length of the crown tooth flank. In this case, the gear can be rotated around the rotational axis 1. Due to a plurality of different crown tooth flanks, and as a result due to a plurality of like tooth flanks with different tooth flank length, an especially good stimulation behavior of the gear can be achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A gear for power transmission, comprising:
a plurality of teeth each having two tooth flanks for power transmission to another gear, wherein
the gear is rotatable around a rotation axis and has a reference plane arranged orthogonally to the rotation axis,
like tooth flanks are tooth flanks for power transmission in a rotational direction,
the tooth flanks, starting from a front side of the reference plane have a tooth flank length, wherein two like tooth flanks which are directly adjacent to a crown tooth flank are arranged, which each have a smaller tooth flank length than the crown tooth flank,
the gear comprises at least one of said crown tooth flanks and is configured as a helical gear, and
the gear has at least three different tooth flank lengths.

2. The gear as claimed in claim 1, wherein
the gear has two or more crown tooth flanks,
the two or more crown tooth flanks each are directly adjacent to respective two like tooth flanks which each have a smaller tooth flank length than the crown tooth flank,
the two or more crown tooth flanks are spaced away from each other in a circumferential direction of the gear by two or more different distances.

3. The gear as claimed in claim 1, wherein
the tooth flank lengths are distributed randomly over the circumference of the gear.

4. The gear as claimed in claim 1, wherein
the tooth flanks, starting from a back side of the reference plane, have a back-mounted tooth flank length, wherein two like tooth flanks which are directly adjacent to a back-mounted crown tooth flank are arranged, which each have a smaller back-mounted tooth flank length than the back-mounted crown tooth flank, and
the gear comprises at least one back-mounted crown tooth flank.

5. The gear as claimed in claim 4, wherein
the gear has two or more back-mounted crown tooth flanks,
the two or more back-mounted crown tooth flanks are spaced away from each other in a circumferential direction with a distance of separation being equal to one back-mounted crown flank, and
the gear has two or more different back-mounted crown flank distances.

6. The gear as claimed in claim 5, wherein
the gear has a plurality of various back-mounted tooth flank lengths.

7. The gear as claimed in claim 6, wherein
the back-mounted tooth flank lengths are distributed randomly over the circumference of the gear.

8. The gear as claimed in claim 4, wherein
a tooth flank has an overall flank length, and
the overall flank length is the sum of the tooth flank lengths and the back-mounted tooth flank length of the respective like tooth flank, and
three or more overall flank lengths of the gear are the same in size.

9. A gear pair for power transmission, comprising:
a first and a second gear as claimed in claim 4.

10. A vehicle transmission for transmission of drive power from at least one drive unit in a direction of a driven vehicle axle of a motor vehicle, comprising:
at least one or a plurality of gears as claimed in claim 4.

11. A gear pair for power transmission, comprising:
a first and a second gear as claimed in claim 1.

12. A vehicle transmission for transmission of drive power from at least one drive unit in a direction of a driven vehicle axle of a motor vehicle, comprising:
at least one or a plurality of gears as claimed in claim 1.

* * * * *